US009301100B1

(12) United States Patent
Jampani et al.

(10) Patent No.: US 9,301,100 B1
(45) Date of Patent: Mar. 29, 2016

(54) INDOOR POSITIONING SYSTEMS AND WIRELESS FINGERPRINTS

(71) Applicant: BlackBerry Limited, Waterloo (CA)

(72) Inventors: Krishnam Raju Jampani, Kitchener (CA); Daryl Joseph Martin, Kitchener (CA); I-Ming Tsai, Waterloo (CA); Jason Christopher Beckett, Kitchener (CA); Jerry Mailloux, Wellesley (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/803,493

(22) Filed: Jul. 20, 2015

(51) Int. Cl.
*H04W 4/02* (2009.01)
*H04W 4/04* (2009.01)

(52) U.S. Cl.
CPC .............. *H04W 4/028* (2013.01); *H04W 4/021* (2013.01); *H04W 4/043* (2013.01)

(58) Field of Classification Search
CPC ..... H04W 4/043; H04L 29/06; H04L 67/306; G01S 5/0236
See application file for complete search history.

(56) References Cited

U.S. PATENT DOCUMENTS

| 7,058,414 | B1 * | 6/2006 | Rofheart | G01S 7/023 455/411 |
| 8,532,675 | B1 * | 9/2013 | Pasquero | H04M 1/72572 345/158 |
| 8,669,844 | B2 | 3/2014 | Walker et al. | |
| 2002/0095486 | A1 * | 7/2002 | Bahl | H04L 29/06 709/223 |
| 2010/0109864 | A1 * | 5/2010 | Haartsen | G01C 21/206 340/539.13 |
| 2012/0056785 | A1 * | 3/2012 | Jovicic | G01S 5/0236 342/450 |
| 2012/0078676 | A1 | 3/2012 | Adams et al. | |
| 2012/0225678 | A1 * | 9/2012 | Cha | H04W 24/08 455/457 |
| 2013/0165152 | A1 * | 6/2013 | Nichols | H04L 67/306 455/456.3 |
| 2013/0210460 | A1 * | 8/2013 | Subramanian | B61L 15/0027 455/456.3 |
| 2013/0244691 | A1 * | 9/2013 | Kelly | H04W 4/043 455/456.1 |
| 2013/0257657 | A1 * | 10/2013 | Garin | G01C 21/206 342/451 |
| 2014/0011518 | A1 * | 1/2014 | Valaee | G01S 5/0252 455/456.1 |

\* cited by examiner

*Primary Examiner* — Ashish K Thomas
(74) *Attorney, Agent, or Firm* — Rowand LLP (57) ABSTRACT

An indoor positioning system and method that correlates map locations to respective wireless access point (AP) fingerprints, and wherein each wireless AP fingerprint is a plurality of wireless AP signal measurements associated with the correlated map location. The method includes receiving position-inference data associated with a user; determining a probable location inside the building based on the position-inference data; receiving wireless AP signal measurements detected by a wireless device associated with the user; associating the probable location with the wireless device based on the association between the position-inference data and the user of the wireless device; and updating the wireless AP fingerprint correlated to the probable location using the received wireless AP signal measurements. The method and system use crowd-sourcing to build and refine the wireless AP fingerprints.

21 Claims, 4 Drawing Sheets

INDOOR POSITIONING SYSTEMS AND WIRELESS FINGERPRINTS

TECHNICAL FIELD

The present disclosure relates to indoor positioning systems and methods of building or refining wireless fingerprints for indoor positioning.

BACKGROUND

Indoor positioning systems are useful for determining device location within buildings. One type of indoor positioning system is based on wireless access point (AP) fingerprinting. A common indoor wireless network is a WiFi network based on the IEEE 802.11 standard. An indoor positioning system may base positioning decisions on a map of the signals detected from installed WiFi APs at various points in a building or campus. Building such a map of fingerprints correlated to facility locations is a laborious process for IT administration.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present application describes the building or refinement of wireless AP measurements for an indoor positioning system using crowd-sourcing. In particular, position-inference data from a wireless device may be used to determine a probable location, and then wireless AP measurements from that device taken at the same time may be used to build or refine the wireless fingerprint associated with that probable location. Carried out using a plurality of devices for a facility, the crowd-sourced fingerprint data may refine and improve the reliability of an indoor positioning system in some embodiments.

In one aspect, the present application describes an indoor positioning system for a building, the building having a plurality of wireless access points distributed throughout the building and connected to the indoor positioning system via a network. The system may include a memory storing map data and wireless access point fingerprints, wherein each fingerprint is correlated with a map location and is a plurality of wireless access point signal measurements associated with that correlated map location; and a processor to receive position-inference data associated with a user, determine a probable location inside the building based on the position-inference data, receive wireless access point signal measurements detected by a wireless device associated with the user, associate the probable location with the wireless device based on the association between the position-inference data and the user of the wireless device, and update the wireless access point fingerprint correlated to the probable location using the received wireless access point signal measurements.

In yet another aspect, the present application describes a method of refining an indoor positioning system for a building, wherein the system correlates map locations to respective wireless access point (AP) fingerprints, and wherein each wireless AP fingerprint is a plurality of wireless AP signal measurements associated with the correlated map location. The method includes receiving position-inference data associated with a user; determining a probable location inside the building based on the position-inference data; receiving wireless AP signal measurements detected by a wireless device associated with the user; associating the probable location with the wireless device based on the association between the position-inference data and the user of the wireless device; and updating the wireless AP fingerprint correlated to the probable location using the received wireless AP signal measurements.

In yet another aspect, the present disclosure describes a computer-readable medium storing processor-executable instructions which, when executed, cause a processor to perform one or more of the methods described herein.

Other example embodiments of the present disclosure will be apparent to those of ordinary skill in the art from a review of the following detailed descriptions in conjunction with the drawings.

In the present application, the term "and/or" is intended to cover all possible combination and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application makes reference to "position-inference data" associated with a user of a wireless device. This term is meant to include data that does not directly specify the current location of the wireless device, but which may be used to infer the location of the wireless device based on the association between the wireless device and the user. For example, GPS data from the wireless device, selection of a point/location on a map on the wireless device, or manually input location information are all "positional" data that directly specify the location of the wireless device. Position-inference data may include, for example, a meeting location in an entry in a user's calendar, from which it may be inferred that the user, and thus the wireless device, is present in that location at the time of that calendar entry. Another example is a user's assigned cubicle, which may be used, in conjunction with work hours and/or calendar data, to infer that the user's wireless device is likely in that cubicle location. In yet another example, position-inference data may include detection of a user's security card at a NFC access point, which may be used to infer that the user's wireless device is also likely at that access point location. Other examples of position-inference data will be appreciated based on the description below.

Any references herein to the term "employee" is not intended to be restrictive in terms of the relationship between the individual and the organization, and should be interpreted broadly as including any individual within an organization.

Many contemporary handheld devices contain a Global Navigation Satellite System (GNSS) chip and antenna, such as a Global Positioning System (GPS) chip and antenna. This enables the handheld device to determine its location using broadcast signals received from four or more satellites. Naturally, to function correctly, the handheld device must have a direct line-of-sight to the four or more satellites, meaning that GNSS systems do not work well indoors. Moreover, the resolution and accuracy (depending on the system) may be in the range of several meters (for non-licensed civilian use). Accordingly, GNSS systems are not suitable for use in connection with indoor positioning systems.

Indoor positioning systems are useful for determining device location in GNSS-denied environments, such as within buildings. A system capable of determining a device's location with accuracy in a building or campus enables a number of potential applications, including indoor navigation.

One type of indoor positioning system is based on wireless access point (AP) fingerprinting. A common indoor wireless network is a WiFi network based on the IEEE 802.11 standard. An indoor positioning system may base positioning decisions on a map of the signals detected from installed WiFi APs at various points in a building or campus. The WiFi APs each broadcast packets, often advertising the BSSID of the WiFi AP. A handheld device may measure the received signal strength to produce a received signal strength indicator (RSSI) for each WiFi AP signal it can detect. The RSSI measurement from one or more WiFi APs may be correlated to a location on a facility map.

In order to determine expected WiFi RSSI measurements at various locations in the facility, the map is typically built manually. In particular, a facility or IT staff member typically must go to each location in a facility with a handheld device, which then takes WiFi RSSI measurements. The staff member then manually reports his or her location on the facility map so that it can be associated with the RSSI measurements taken at that location. It will be appreciated that this may be a labour-intensive task.

In one aspect, the present application proposes an indoor positioning system that uses crowd-sourcing to create or refine its wireless AP fingerprinting data. In a work environment, the data may be obtained from devices associated with a plurality of employees. Rather than relying upon the employees to actively and manually report location information, the present system and method may use non-positional user-associated data, which is used to determine a probable location and, thus, to associate wireless AP signal measurement data from a device associated with that user with that probable location, correlated in time.

In some embodiments, a suitable confidence weighting may be applied to various measurements based on the reliability of the probable location determination, which may depend on the nature of the non-positional user-associated data. In some embodiments, the weight may also take into account the number of measurements, consistency/variability, and/or number of sources/users, among other factors.

Figure 1:
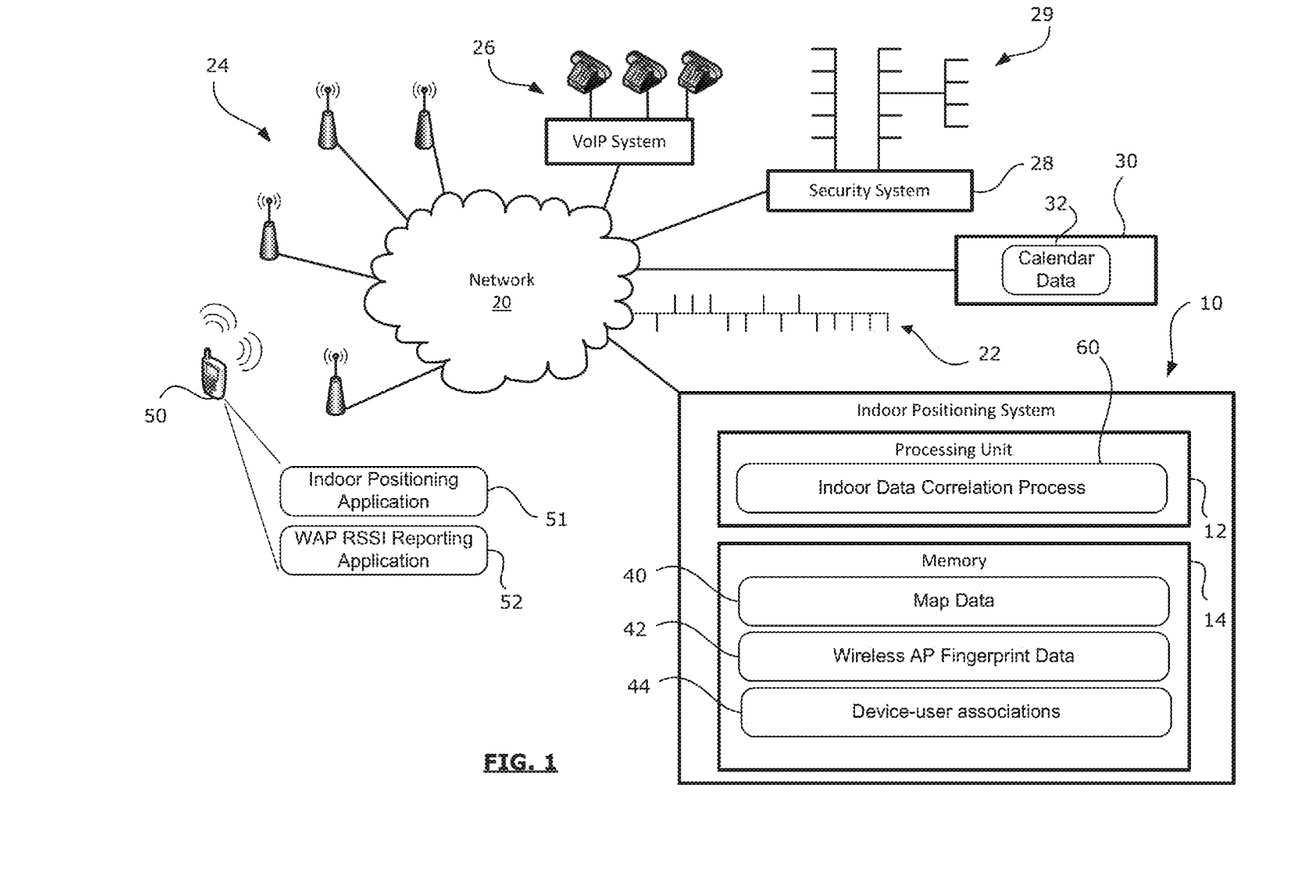
FIG. 1 diagrammatically shows one example of an indoor positioning system for a building.

Reference is now made to FIG. 1, which diagrammatically shows one example embodiment of an indoor positioning system 10 connected to a network 20. The network 20 may include one or more wired or wireless networks, or combinations of both. For example, the network 20 may be an intranet installed in a specific building or collection of buildings, e.g. a campus, for an organization such as a university, a corporation, or the like. The network 20 includes a plurality of wireless APs 24, such as WiFi APs. The wireless APs 24 provide wireless network coverage within the facility and provide connectivity to a mobile device and other computing devices equipped for wireless communication using a designated protocol (e.g. IEEE 802.11). The wireless APs 24 are distributed throughout the facility/building in known locations and each wireless AP 24 is configured to periodically broadcast an identifier unique to that wireless AP 24.

The network 20 may connect to, or include, a number of other systems or subsystems. For example, the network 20 may include a plurality of Ethernet ports 22 or other physical ports for connecting computing devices to the network 20. The Ethernet ports 22 may be distributed throughout the facility. The facility may also feature a security system 28 for permitting access by way of security card or other magnetic or near-field communication device. Accordingly, the security system 28 in this embodiment features a plurality of NFC readers 29, each NFC reader 29 corresponding to a security access point, such as a door or turnstile, requiring an authorized communication from a passcard, smartphone, key fob, or the like. The security system 28 may be connected to the network 20.

In some embodiments, the network 20 may also connect to a VoIP system 26 featuring a plurality of desktop VoIP phones. Each VoIP phone in the VoIP system 26 may be associated with a specific location (e.g. an office, cubicle, etc.). In most instances, the VoIP phones are connected to Ethernet ports and the communications traffic from the VoIP phones are routed by the network 20 to a server or servers that operate and implement the VoIP system 26.

The network 20 may connect to a number of other servers 30 that execute various functions, such as storing and maintaining calendar data 32 for example. The calendar data 32 may be stored and managed within a scheduling program or integrated email/calendar/reminder program, such as that implemented by Microsoft™ Exchange™, for example. The calendar data 32 may provide information regarding scheduled meetings, locations, attendees, etc.

A wireless device 50 equipped for wireless communication via the wireless APs 24 is capable of receiving broadcast messages or signals output by the wireless APs 24. In known manner, the wireless device 50 measures the received signal strength (RSSI) of detected signals from the wireless APs 24. The wireless device 50 may include an indoor positioning application 51. The indoor positioning application 51 detects RSSI measurements for wireless AP signals and attempts to correlate them with wireless AP fingerprints that are themselves correlated to a location in the facility. In this manner, the indoor positioning application 51 may determine the current location of the wireless device 50. The wireless AP measurements may be obtained from a chipset, such as a WiFi chip, in some embodiments. The indoor positioning application 51 may include a graphical map interface module for displaying a map of the facility with an indicator of the determined location, so as to communicate current position to the user.

From time-to-time, the indoor positioning system 10 may transmit updated fingerprint data to wireless devices, like the wireless device 50, for use by the indoor positioning application 51. The indoor positioning system 10 may also transmit updated map data as the facility map is refined and improved.

In some embodiments, the indoor positioning application 51 may not determine the wireless device's location in the facility directly, but may send the measured RSSI values to the indoor positioning system 10, which then performs the computational work of correlating the measured RSSI values to wireless AP fingerprints and, in response, sends the wireless device the determined location.

The wireless device 50 in this example also includes an RSSI reporting application 52, which relays RSSI measurements from the wireless device 50 to the indoor positioning system 10 for use in refining or building wireless AP fingerprints for the facility. The RSSI reporting application 52 may, in some embodiments, be a part of the indoor positioning application 51, or may be a standalone and separate software module. The RSSI reporting application 52 may be configured to relay measurements continuously, in batches, periodically, or on some other schedule. The data sent from the wireless device 50 to the indoor positioning system 10 may include an RSSI measurement, time stamp, and wireless AP identifier associated with the RSSI measurement and obtained from the broadcast signal being measured (e.g. a MAC address). It may further include an identifier for the wireless device 10. In some embodiments, it may include sensor data, user ID data, calendar-based event data, etc.

The indoor positioning system 10 may include a processing unit 12 and memory 14. The processing unit 12 may include one or more processing units in one or more computing devices, e.g. servers. The memory 14 includes map data 40 defining the boundaries and accessible and inaccessible areas of the facility and wireless AP fingerprint data 42. The wireless AP fingerprint data 42 is data for one or more locations or positions in the facility, i.e. at a point on the map, and corresponding expected wireless AP measurements at that location associated with a plurality of wireless APs. The expected wireless AP measurements are based upon collected data from wireless devices that have reported measurements from that location. In some cases, the wireless AP fingerprint data includes a history of all such measurements associated with a certain location, an average, a weighted average, or some other combination of actual measurements of a given wireless AP's signal strength that produces an expected value. In some embodiments, the indoor positioning system 10 includes both a history (or partial history) of wireless AP measurements reported from a certain location and a wireless AP fingerprint derived from those measurements, where the wireless AP fingerprint specifies the expected measurement values.

Wireless AP fingerprint data 42 allows the indoor positioning system 10 (or an application on a mobile device that receives the wireless AP fingerprint data from the indoor positioning system 10) to determine the current position of a mobile device based on detected wireless AP RSSI values.

In order to build or refine the wireless AP fingerprint data 42, the indoor positioning system 10 receives wireless AP measurement data from a plurality of wireless devices in the facility and associates the measurements with specific locations in the facility by determining the probable location of each wireless device. The indoor positioning system 10 includes an indoor data correlation process 60 executed by the processor 12 to obtain position-inference data associated with a user of the wireless device, and to then determine (i.e. infer) the probable location of the wireless device based on the position-inference data.

The memory 14 may also store device-user associations 44, specifying the association between each wireless device 50 and a user. The association may link a wireless device identifier (e.g. a phone number, serial number, etc.) with a user identifier (e.g. a name, employee number, etc.).

The indoor data correlation process 60, when invoked, may locate a device identifier in received wireless AP measurement data and may, based on the device-user associations 44, determine the associated user. The indoor data correlation process 60 may then obtain or request position-inference data associated with that user and, based on the position-inference data, determine a probable location of the wireless device that reported the wireless AP measurement data. If the process 60 is able to determine the probable location with at least a threshold level of confidence, then the wireless AP measurement data may be used to create or refine the wireless AP fingerprint data associated with that location.

In another embodiment, the indoor data correlation process 60 reacts in response to receipt of position-inference data, such as from a security access point or other "check-in" point that correlates to a high probability that the user is present in that specific location. In response to such position-inference data, the indoor data correlation process 60 may request wireless AP measurement data from the user's device, which may be tested against expected data for that location to confirm that the device is present with the user at that location with a sufficiently high degree of probability. In other words, if a security badge is detected at an access point, the system may instruct the wireless device associated with the user associated with the security badge to conduct and report WiFi signal scans. In some embodiments, the wireless device may be configured to conduct WiFi scanning and signal measurement in response to an NFC sensor read operation by the device. The device may be configured to automatically report WiFi measurements when an NFC sensor read operation occurs. The process 60 may then use the received wireless AP measurement data to refine the wireless AP fingerprint data associated with that location. It may also continue to collect wireless AP measurements as the user moves from that location and may attempt to correlate the received data with the user's travel path in the facility (obtained using sensor-based dead reckoning) and, thus, associate that measurement data with a series of locations in the facility, as will be described further below. A device configured to conduct and report WiFi scanning and reporting may be configured or instructed to do so for a set period of time following the "check-in" event, such as for 1, 5, 10 or 30 minutes, as examples. Alternatively, the device may be configured to conduct and report WiFi scanning and report until instructed to stop; for example, by the indoor positioning system or in response to determination that the device has exited the facility or is in too uncertain a location to reliably use the reported measurements.

Example sources of position-inference data include the Ethernet ports 22, the VoIP system 26, the security system 28, and calendar data 32. Additional and alternative sources may be used in some embodiments.

Figure 2:
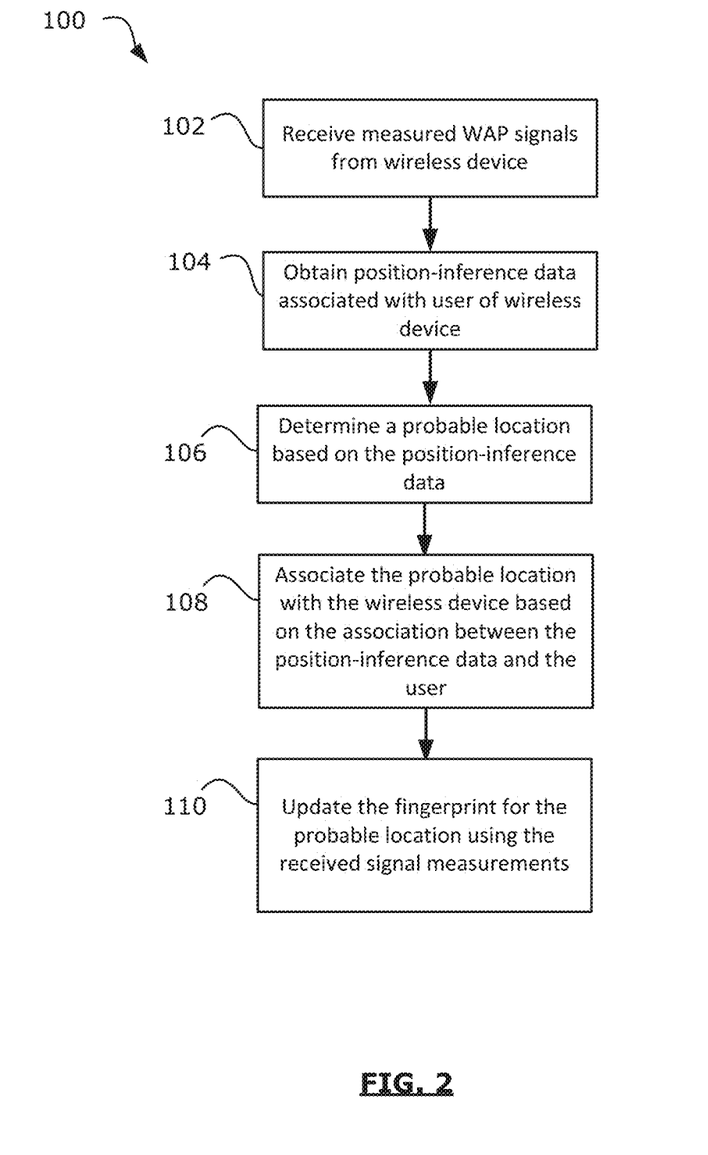
FIG. 2 shows, in flowchart form, one example process for building or updating fingerprint data for an indoor positioning system.

Reference is now made to FIG. 2, which shows, in flowchart form, one example process 100 for refining wireless AP fingerprint data in an indoor positioning system using crowdsourced data. In operation 102 the indoor positioning system receives wireless AP measurements from a wireless device within the facility. The wireless AP measurements specify RSSI values determined by the wireless device at a given point in time as indicated by one or more timestamps included with the RSSI values. RSSI values may be specified for a plurality of wireless APs detected by the device.

The indoor positioning system then, in operation 104, obtains position-inference data associated with a user of the wireless device. This may include determining the user associated with the wireless device and then determining what sources of position-inference data are available. In some instances, the indoor positioning system may query one or more subsystems for position-inference data relating to the user. The query may specify a time, times, or range of time that correlate to the time(s) at which the measurements were taken.

In one embodiment, the position-inference data is a user's cubicle or office assignment. This may, in some examples, be a default location where a user is presumed to be unless other position-inference data indicates differently with a sufficient degree of confidence (i.e. above some threshold measure of confidence).

In a further embodiment, the position-inference data is calendar data associated with the user. The calendar data may include, for example, meetings, conference calls, and other scheduled events in which the user may have participated. Calendar entries relating to a meeting may specify a meeting room in the facility. Calendar entries relating to a conference call may be cross-referenced with phone records to confirm participation in the call from a particular phone, which then places the user at the location of that phone for the duration of the call. Events that indicate that the user is likely offsite (e.g. meetings with a location outside the facility) can be used to infer that the user is not in the facility. In some cases, the user's calendar may be used to infer that the user is at his or her desk during times when a meeting or other event is not scheduled during work hours.

In another embodiment, the position-inference data is security system data associated with the user. In particular, for example, the security system may provide data indicating times at which the user's passcard or other NFC security device is detected at various access points, which thereby indicate with a fairly high degree of accuracy the location of the user at that time.

In yet a further embodiment, the position-inference data may include VoIP system data relating to the user's assigned desk phone. When that phone is detected as being in use, it may be inferred with some confidence that the user is at his or her desk.

In another embodiment, the position-inference data may be Ethernet port data. In particular, for example, a portable computing device associated with a user, such as a laptop or other such device, may be detected connecting to an Ethernet port in, for example, a meeting room. Under such circumstances, it may be inferred that the user is present in the meeting room.

In yet another embodiment, the position-inference data may include other position-inference data. The position-inference data may also include a combination of any of the above or other position-inference data sources.

In all such cases, it is assumed that the position of the user is reasonably correlated to the location of his or her wireless device, on the presumption that employees carry their wireless devices with them as they move about the facility.

In operation 106 the indoor positioning system determines a probable location for the wireless device based on the position-inference data associated with the user. The determination of a probable location partly depends on the nature of the position-inference data. For example, access points and other NFC points, the system has data regarding the physical location in the facility of NFC security points and receives data identifying one of those security points and a user identifier that pinpoints the user as having scanned his or her security token at that location at a particular time. In another example, with Ethernet ports, charging stations, and the like, a user device may be detected as attaching to the port and the system may store an association between a user and one or more device identifiers, e.g. serial numbers, MAC addresses, or other identifying data that may be obtained from the device via the port being used. The system also stores data regarding the physical location of each port, and can thereby determine the user's probable location based on that association.

As indicated by operation 108, the probable location may then be associated with the wireless device based on the association between the user and the wireless device and the association between the position-inference data and the user. The association between the wireless device and the probable location is for the purpose of correlating measurement data to that probable location, as is not a permanent or lasting association.

Assuming a sufficient degree of confidence (e.g. greater than a threshold measure of confidence) regarding the probable location has been established, in operation 110 the wireless AP fingerprint associated with that location is updated using the wireless AP measurement data provided by the wireless device. The terms "update" and "refine" are used interchangeably in the present application to indicate that the fingerprint is processed and, possibly, modified to some degree based on the new wireless AP measurement data. The update/refinement may involve a weighted averaging of the new wireless AP measurement data with previously-obtained measurements. For example, more recent measurements may be allocated a higher weight than older measurements.

In one embodiment, the system may have a blacklist/whitelist process for designating trusted wireless APs for location determination. When an AP moves location or is determined to be in a new area, it is on the blacklist, meaning that measurements of the AP's signals are used to build up and refine fingerprints for locations nearby, but its measurements are not necessarily trusted to provide location. In other words, location determinations rely upon the signal strength measurements of other APs in the area and matching those to fingerprints; the blacklisted AP's fingerprint is too uncertain as yet to be used in location determination. After a set of criteria are met (for example, a threshold number of measurements crowdsourced, or a threshold length of time, etc.), then the wireless AP may be moved from the blacklist to the whitelist, meaning its fingerprint is trusted and it can factor into location determinations. This can prevent transient APs from being used for location determinations, for example, such as a hotspot provided via a laptop or other mobile device.

It will be appreciated that once a set of fingerprints are obtained for a floor plan, the system may automatically fill-in fingerprints for the remainder of the floor using crowd-sourcing. In particular, the system may have collected sensor data from devices for short bursts when the users are walking and may use that sensor data to estimate the device path via dead reckoning. This path estimation can be further improved by fusing it with facility map data, perhaps using a particle filter. Once the user path is determined, the system then assigns a location to each WiFi scan that happened during that walk by correlation with time, thereby mapping the scans to locations in the floor plan.

It will be appreciated that these operations may be carried out in near-real time as the wireless device is measuring and reporting RSSI values, or may be carried out afterwards.

In another embodiment, the indoor positioning system may be configured to receive or obtain position-inference data and, based on that data, determine probable location of an associated user. When probable location is determined to meet at least a threshold degree of confidence, then the system may request wireless AP measurement data from the user's wireless device for the purpose of refining the wireless AP fingerprints.

Figure 3:
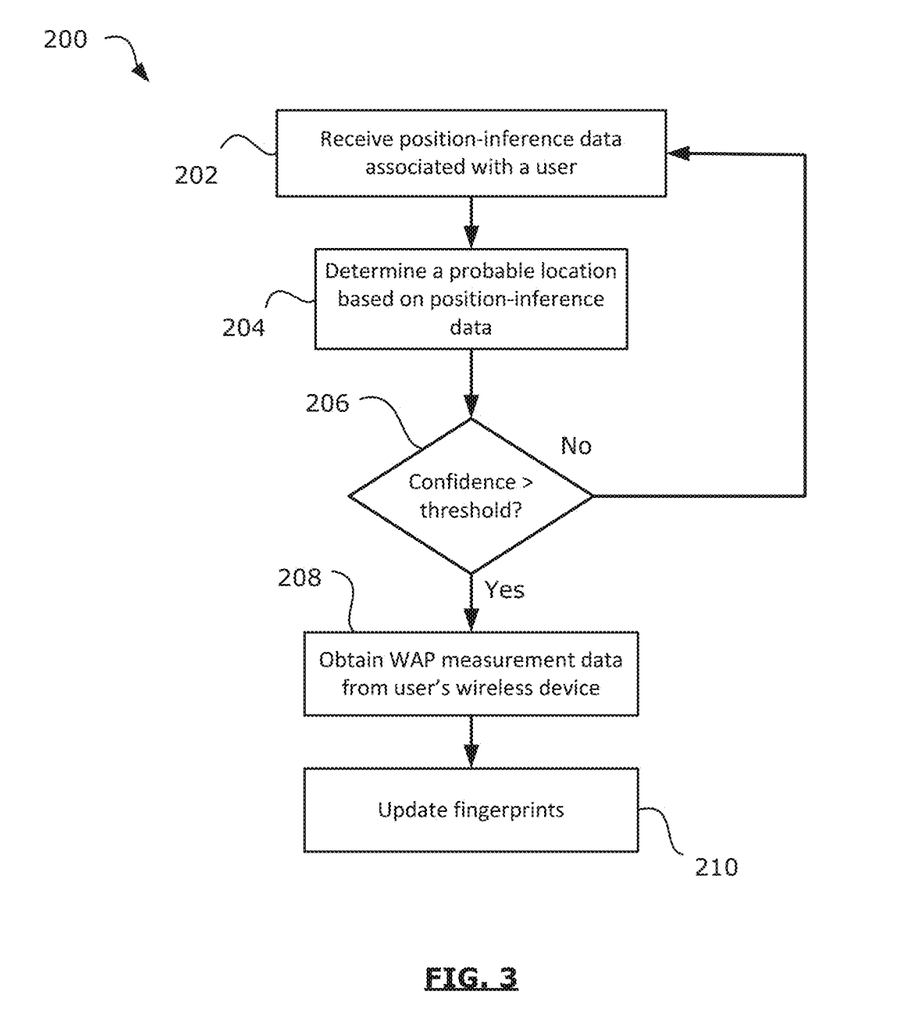
FIG. 3 shows, in flowchart form, another example process for building or updating fingerprint data for an indoor positioning system.

Reference is now made to FIG. 3, which shows, in flowchart form, another example process 200 for refining wireless AP fingerprints. In this example process 200, the indoor positioning system receives position-inference data associated with a user in operation 202. In one embodiment, the indoor positioning system requests position-inference data from one or more subsystems. In another embodiment, the one or more subsystems may be configured to send position-inference data to the indoor positioning system on the occurrence of certain detected events. For example, when a computing device is detected as attaching to the network via an Ethernet port, the presence of the computing device at that Ethernet port and its association with a particular user may be reported to the indoor positioning system. Likewise, if the user's security passcard or other NFC device is detected at an access point, it may be reported to the indoor positioning system.

In operation 204, the indoor positioning system determines a probable location of a wireless device associated with the user based on the received position-inference data associated with that user. The determination of the probable location may also include determining a confidence level. If more than one source of position-inference data is available, or if we have position-inference data from multiple users at the same/similar locations, a higher confidence level may be assigned. Certain types of position-inference data may have a higher degree of confidence associated with them, such as detection of a user passcard at a security access point. Combining more than one source of position-inference data may improve the ability to assign a confidence level. For example, if two sources of position-inference data indicate the same location, or a similar location (e.g. within a maximum distance, such as 1 or 2 meters), then the determined probable location will have a higher degree of reliability then if two sources of position-inference data conflict.

In operation 206, the indoor positioning system assesses whether the confidence level of the probable location is high enough to meet a threshold. If not, then the indoor positioning system returns to operation 202 to await new position-inference data. If yes, then the indoor positioning system proceeds to operation 208, in which it obtains wireless AP measurement data from the wireless device associated with the user determined to be at the probable location. In one embodiment, the indoor positioning system requests wireless AP measurement data from the wireless device and, in response, the wireless device measures wireless AP signal strength and relays the determined RSSI values to the indoor positioning system. Such an embodiment operates in real-time as the user is determined to be at a probable location. In another embodiment, the wireless device periodically (e.g. with a predetermined frequency) collects and stores wireless AP measurement data in its memory. In such an embodiment, the indoor positioning system may send a request to the wireless device that specifies the time at which the user was determined to be at the probable location, and the wireless device retrieves the corresponding stored wireless AP measurements from memory and sends them to the indoor positioning system. Alternatively, the devices may be configured to automatically forward all wireless AP measurement data to the indoor positioning system, perhaps at the end of each work day, and the indoor positioning system may keep and use the measurements that correlate to a time at which it determined the device's probable location and discard the rest of the measurements.

In operation 210, the indoor positioning system updates or refines the wireless AP fingerprints using the obtained wireless AP measurement data.

In some embodiments, operation 210 may include a comparison of the current wireless AP fingerprint for the probable location and the obtained wireless AP measurement data before performing the update/refinement. If the wireless AP measurement data differs by a significant degree (e.g. by more than a maximum amount) from the fingerprint, then the measurement data may be considered too unreliable to be correlated to the probable location. For example, if the measured signal strength of the various APs is more than a threshold percentage different from the signal strength indicated by the fingerprint, then the measurements may be unreliable. A significant difference in signal strength of one AP may indicate a signal problem with the AP in some instances, but a difference with two or more APs may indicate that the wireless device is likely not in the probable location. As another example, if the measurement data includes signals from one or more APs not present in the fingerprint and/or known to be distant from the probable location, then the probable location determination is likely inaccurate. If this "sanity check" results in a determination that the measurement data is too unreliable to be correlated to the probable location, then it may be discarded.

A failed "sanity check" on the measurement data may indicate that the probable location determination was inaccurate, or that the assumption that the user is carrying his or her wireless device is invalid. Either way, the measurement data would not be used to update the wireless AP fingerprint in those circumstances.

In other embodiments, the above-described "sanity check" is not used since it may prevent necessary updates to the fingerprints in some circumstances, such as if wireless APs are moved. In such embodiments, the criteria for incorporating a measurement into a fingerprint is not based on correlation to the existing fingerprint but instead depends on other factors, such as multiple sources agreeing on the measurements. In some cases, a measurement may be incorporated into a fingerprint using a weighted average of the fingerprint and the observation (giving more weight to new observations). In this manner, the fingerprints are reliable but also flexible enough to be adjustable according to the changes in the WiFi AP configuration.

In one embodiment, the position-inference data that triggers reading of wireless AP measurements is "check-in" data, where a "check-in" is a point at which a user's location is known with a high degree of accuracy. Examples include detection of a user passcard at a security access point, detection of a user login or user device connection at a specific computer or Ethernet port, or detecting connection of a user-associated device, such as the wireless device to a charging port.

High confidence probable locations may enable the indoor positioning system 10 to improve fingerprinting of locations on paths leading away from those locations. For example, if a wireless device is determined to be at a probable location with high confidence (e.g. at a check-in location, like a security access point), then the system may use sensor data from the device and dead reckoning to determine a travel path. The check-ins give a known starting point for the travel path. Using sensor data from the device and fusing it with the map data, a device travel path may be determined so as to pinpoint the device's location on a floor over a period of time. If a subsequent check-in is detected (e.g. login at a user's computer, another security access point, etc.), then the indoor positioning system 10 has an end point to serve as an additional constraint to the determination of the path taken by the device.

To improve the ability of the system to accurately determine a user's path, additional position-inference data may be used in determining the travel path. For example, data detected by the wireless device during the travel time may correlate to one of the candidate paths. Data detected may include wireless AP measurements, Bluetooth™ signals detected, or other wireless signals sensed by the device during travel that can be correlated to locations in the facility and/or other user devices that are expected to be (or can be determined to be using the indoor positioning system and their own wireless AP measurements) in particular locations in the facility.

If the indoor positioning system is able to determine a user's path for at least a portion of the time following a high reliability check-in, and that path determination is established with more than a threshold degree of confidence, then the indoor positioning system may obtain wireless AP measurement data from the wireless device relating to the travel time and may use that data to refine fingerprints associated with the locations along the determined travel path.

It will be appreciated that, over time, and with the involvement of a plurality of employees or co-workers each having a wireless device, the indoor positioning system is able to gather a great quantity of data correlated to locations in the facility, particularly along more frequently traveled paths and at check-in locations. This enables the system to accurately refine the fingerprints correlated to those paths and locations.

For most employees, the majority of the time at work is spent in an assigned location, such as a cubicle, office, or other workstation. Knowing the correlation between users and their assigned location, allows the system to develop highly refined fingerprints associated with those locations and locations along paths leading from those locations. Position-inference data may be used to improve the determination that a user is at his or her assigned location. For example, initiating a VoIP call from a desktop phone, logging into a user account via a desktop computer, plugging in a user-associated device at a local charging station, or other detected non-positional events may be linked to a higher confidence that the user is at his or her assigned location. Accordingly, wireless AP measurements taken at that time by the user's wireless device may be confidently correlated to that location and used to refine the fingerprint for that location.

Other position-inference data or wireless AP measurement data may be used to determine when a user leaves his or her assigned location and to determine the likely path taken. In many cases, the initial path is restricted to one or two options and the system may be able to reliably estimate the user's location for at least a portion of the initial travel. This portion is also likely to be among the least frequency traveled areas of the facility, e.g. along cubicle rows, which facilitates the repeated refinement of locations that are not well-traveled.

Applications

A refined and accurate indoor positioning system may find use in a number of applications aside from displaying a user's current position on a map of the facility.

In one embodiment, the indoor positioning system determines when a user has established a new work location and updates an internal employee location map or list.

Many workplaces have a map of assigned employee locations, i.e. the desk or office or cubicle assigned to each user and at which each user is expected to do the majority of his or her work. In some cases, users that are not assigned a fixed location may use one or more "temporary" locations for a period of time. This may be termed "hoteling" in some cases, since some users do not have a permanently assigned location in the facility; instead, the user may take up residence in one of the unassigned locations while in the facility. This can take place, for example, in professional service organizations in which certain employees are off-sight for projects and are in the office for two or three days between projects, as occurs in many consulting organizations. It can also occur with part-time or shared-job situations in which someone is expected to occupy a location for only a portion of the time. Rather than maintaining space that goes unused, organizations may designate certain areas as "shared" locations for use by part-time, shared-job, travelling, or visiting employees.

Large or mid-sized organizations often maintain a map or list of employee locations. In part, this enables other users to determine where a colleague is located in the facility. From an administrative point of view, such a map or list it may be useful for configuring the routing of VoIP calls and/or assignment of telephone extensions; it may also be important for the routing of physical interoffice communications and packages.

The indoor positioning system may be configured to determine when a user appears to have taken up a new location based on collected wireless AP measurements from the user's device. In some cases, the system may alert an administrator to the likely change of employee work location so as to allow the administrator to confirm the change and update the map or list of employee locations. In some other cases, the system may automatically update the map or list of employee locations.

In one example embodiment, the indoor positioning system includes stored employee location assignment data. The location assignment data specifies a facility location for each employee/user. The system may request from user devices periodic wireless AP signal measurement data. Alternatively, user devices may be configured to provide periodic wireless AP signal measurement data without a triggering request from the system. In some instances, the devices may be configured to send the wireless AP signal measurement data if the device first confirms that it is located within the facility, such as by testing detected wireless AP identifier(s) against a stored list of wireless AP identifiers for the facility.

The system may receive the wireless AP measurement data from a user device and may compare it to the expected wireless AP signal data for the employee's assigned location. More than a threshold difference in the received wireless AP measurement data indicates that the user device is not in the assigned location. The received wireless AP measurement data may be compared to the wireless fingerprints for the facility to determine the user device's location. The system may be configured to track user device locations over the course of a day, days, week, weeks, etc., to establish in what locations the user spends his or her time while in the facility.

In some instances, if, over the course of a time period, the user is in a work location other than his or her assigned work location more than a threshold percentage of time, the system may determine that the user has changed work location. For example, if over the course of three days the system determines that the user spends more than 50% of his or her time at a cubicle, desk, or office other than his or her assigned cubicle, desk or office. Then the system may determine that the user has moved to that new location. It may prompt an administrator to investigate in some embodiments. In some embodiments, it may update the employee location list. In yet other embodiments, it may route the user's telephone extension and calls to the new location automatically.

The nature of the new location may influence whether the system determines that the user has changed locations. In some embodiments, once it determines that the user appears to have moved locations, the system may evaluate whether the new location is a legitimate new location. For example, if the new location is a meeting room, boardroom, lab bench, or other non-assignable location, the system may not send an alert to an administrator or update the employee work location map or list, since the user is likely engaged in a project that simply takes him or her away from his or her assigned location for a period of time. However, if the new location is a desk, cubicle or office, then the new location may be legitimate new location to which the user may have relocated.

In some embodiments, the system further assesses whether the new location is an unoccupied or unassigned location. For example, if the new location is a desk, office or cubicle, but that desk, office or cubicle is assigned to a second employee, then the system may not automatically update the employee location map or list. It may send an alert to an administrator to resolve the apparent conflict, in some embodiments. In yet other embodiments, the system may conduct an evaluation of the location data reported by the wireless device associated with the second employee to determine whether that employee also appears to have relocated, in which case the new location may be reassigned to the user.

Different thresholds may be applied to different classes of users. For example, the system may be less likely to determine that a user that is classed as an employee with an assigned location (e.g. with a fixed office or cubicle) has moved to a new location than a user that is classed as a "roaming" employee that is expected to occasionally appear in the office and take up residence at an unoccupied desk. As an example, the system may determine that a user with an assigned location has moved if the user device is located at an unoccupied desk, cubicle, or office more than 50% of the work day over the course of at least three days, and is located at his or her assigned location less than 25% of the work day over that same three days. Conversely, the system may determine the location of a user without an assigned location based on that user being located at an unoccupied desk, cubicle, or office more than 40% of a single work day. These time periods and thresholds are examples; other thresholds or time periods may be used in other embodiments.

Figure 4:
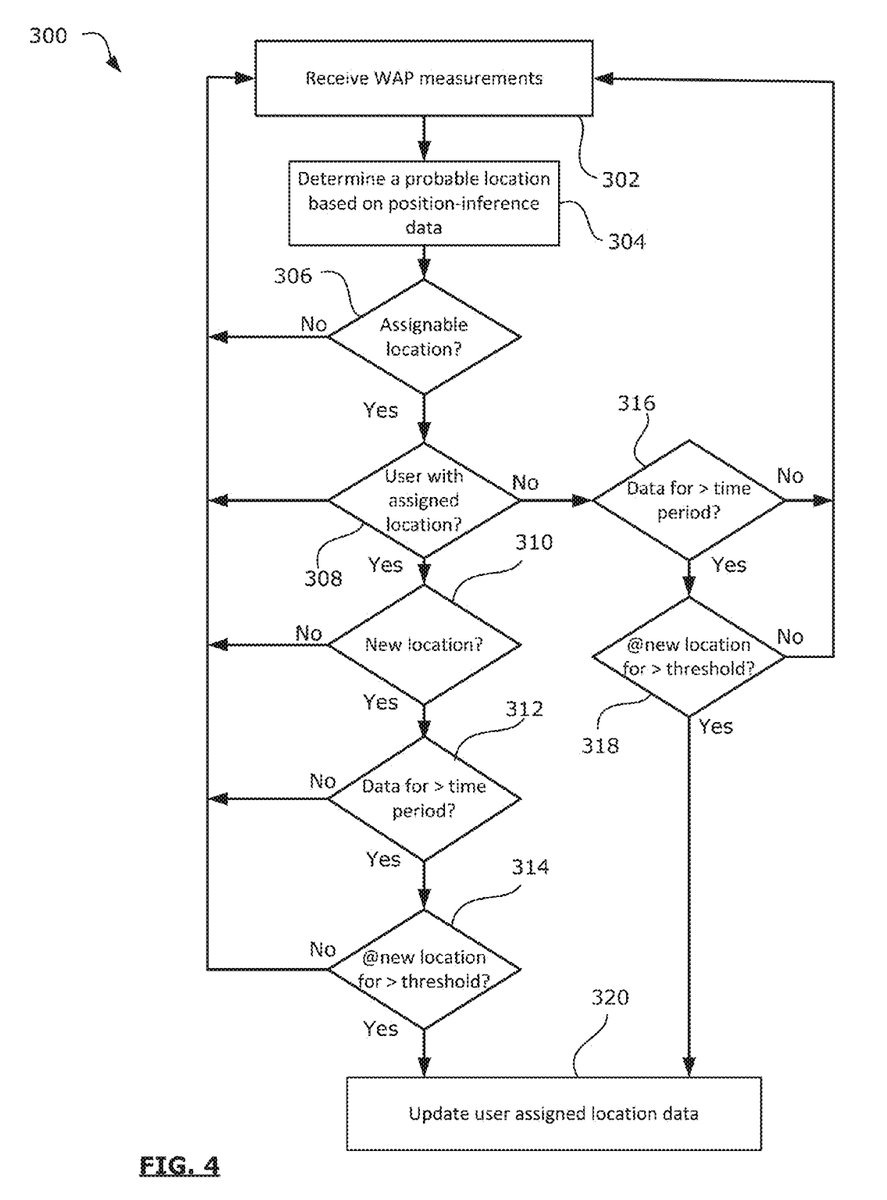
FIG. 4 shows, in flowchart form, one example method of updating employee location data using an indoor positioning system.

Reference will now be made to FIG. 4, which shows, in flowchart form, one example process 300 for updating employee location data for a facility using an indoor positioning system.

The process 300 includes an operation 302 of receiving wireless AP measurement data from a user device. The indoor positioning system associates the user device with a specific user (e.g. employee). In operation 304, using stored wireless AP fingerprints for the facility, the system determines the location of the user device (and, it is assumed, the associated user) based on the received wireless AP measurements. The system may then, in operation 306, assess whether the determined location is an assignable location. If it is not assignable, e.g. a hallway, a meeting room, a common area, etc., then the system may return to operation 302 to await further measurement data.

If the determined location is an assignable location, then the system may assess whether the associated user has an assigned location or not in operation 308. If the user has an assigned location, then the system may evaluate whether the determined location is the same as the user's assigned location, as indicated by operation 310. If so, then no changes are needed and the system returns to operation 302. If the determined location is different that the assigned location, then the system evaluates whether the thresholds have been met for implementing the change. In particular, in operation 312, the system assesses whether it has data spanning a defined time period over which it evaluates location data for an assigned user. For example, the time period may be work day (e.g. 9 am to 5 pm), two or more work days, a week, etc. If the system does not have sufficient recent data (e.g. the user may have been absent or on vacation for one or more recent days, meaning the system is unable to make the necessary assessment). In some instances, the system will assess whether it has determined location data for the user for at least a minimum portion of the time period (since the user's schedule or work habits may mean that he or she is not regularly be in the office for the entire traditional work day, e.g. the user may prefer start at 10 am instead of 9 am). An example minimum portion is 75% of the three most recent work days. If the system does not have sufficient recent determined location data for the user, then it returns to operation 302 to await additional data.

If the system has sufficient data, then in operation 314 it assesses whether the user has been determined to be in the new location for more than a threshold percentage of the time period. In some instances, the time period is the same as the time period used in operation 312, but it is not necessarily the same. The evaluation in operation 314 may be as a minimum percentage time (e.g. greater than 50%), or may be an absolute threshold (e.g. more than 10 hours in two work days), or may be a relative threshold (e.g. in the new location more than three times as often as in any other assignable location). In other embodiments, other thresholds or heuristics may be used as the basis for determining whether a user has moved to the new location.

If the system determines that the user has moved to a new location, then in operation 320, it updates the user assigned location data. In some embodiments, this may involve the system alerting an administrator to the likely change in location. In some embodiments, it may involve automatically updating the assigned user location data. In yet further embodiments, additional changes may be implemented as a result of the change in assigned location, such as the rerouting of the user's telephone extension to a handset located at the new location, or other such changes.

If, in operation 308, the user is determined to be one without an assigned location, then in operation 316, the system assesses whether the system has a sufficient quantity of recent location data associated with the user. As in operation 312, the assessment of whether the system has a sufficient recent history of location data may be based on having received wireless AP measurement data, and determined locations, from the user's device for at least a minimum portion of one or more recent work days. The test in operation 316 is not necessarily the same as in operation 312. For example, the system may rely upon a shorter history of location data for the purpose of assigning a user a location if the user does not have a currently assigned location, as compared to changing a user's assigned location. If, in operation 316, a sufficient history of location data is identified, then in operation 318 the system assesses whether the user has been at the determined location for at least a threshold amount of the relevant time. The relevant time period for the test in operation 318 may be the same as the time period used in operation 316, but not necessarily. The time period of the test in operation 318 may also differ from the time period used in operation 314 in some embodiments. In one example, operation 318 may assess whether the user has been at the location for at least 50% of a work day. Other thresholds and heuristics may be used in other embodiments. If the test in operation 318 is met, then the system proceeds to operation 320 to update the user assigned location data.

It will be appreciated that the process 300 is one example embodiment and that the various tests and evaluations described may be modified or performed in different orders in some embodiments.

In another aspect, the indoor positioning system may be applied to maintenance requests associated with the facility. That is, when a user of a user device causes the device to submit a maintenance request or report regarding amenities of the facility, the indoor positioning system may pinpoint the location of the user device reporting the problem. As an example, the user devices may include a facilities maintenance application configured with various defined maintenance requests. By selecting a particular request button or other interface trigger, a request for a particular maintenance function may be transmitted to facilities manager. In one embodiment, the request may be accompanied by location data provided by the indoor positioning application on the user device. The indoor positioning application assesses the device's current location based upon wireless AP measurements and current wireless fingerprints correlated to map locations. In some embodiments, the wireless AP measurements may be sent to the indoor positioning system, which then sends the device the corresponding location data.

Preconfigured maintenance requests may include requests for a light bulb replacement, a non-functional data port, washroom servicing or supplies, printer repair, meeting room clean-up, janitorial servicing, etc. By tagging the request with location data, the facilities manager or administrator is given immediate information regarding the exact location to which the request relates, without the necessity of the user describing the location or problem in detail in an email or other text message.

In yet another aspect, the indoor positioning system may use received wireless AP measurements to identify anomalies in facilities maps. For example, when determining location based on wireless AP measurements and fingerprint data, the measurements may indicate the user device is in a location that was not supposed to be accessible, or not accessible to the associated user. This may indicate a security access problem, and may prompt an alert to a security administrator. In some instances, where the system determines a path for a user device based upon a series of wireless AP measurement, one or more measurements may indicate that the user's path has crossed a boundary or barrier on the map that should not be crossable. This type of anomaly may trigger an alert of other message to an administrator to assess whether the map is out-of-date.

In another embodiment, the wireless AP measurements may be used to identify non-functional access points. For example, when a user is determined to be in a particular location or on a particular path or trajectory, if the wireless AP measurements correspond to the expected range of signal values for APs in the vicinity of that location, but one of the APs that is supposed to be present in the fingerprint has an actual measured signal strength of zero, i.e. it is missing, then it may indicate that the AP has malfunctioned.

The above applications may further use position-inference data for confirming or improving confidence in a user device's location and, thus, triggering an alert and administrative action.

While the present application includes some descriptions of methods, a person of ordinary skill in the art will understand that the present application is also directed to various apparatus such as a handheld electronic device and a server. The handheld electronic device and the server include components for performing at least some of the example aspects and features of the described methods, be it by way of hardware components (such as the memory and/or the processor), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. An indoor positioning system for a building, the building having a plurality of wireless access points distributed throughout the building and connected to the indoor positioning system via a network, the system comprising:
   a memory storing map data and wireless access point fingerprints, wherein each fingerprint is correlated with a map location and is a plurality of wireless access point signal measurements associated with that correlated map location; and
   a processor to
   receive position-inference data associated with a user,
   determine a probable location inside the building based on the position-inference data,
   receive wireless access point signal measurements detected by a wireless device associated with the user,
   associate the probable location with the wireless device based on the association between the position-inference data and the user of the wireless device, and
   update a wireless access point fingerprint correlated to the probable location using the received wireless access point signal measurements.

2. The system of claim 1, wherein the position-inference data is received from a source other than the wireless device.

3. The system of claim 1, wherein the position-inference data comprises a calendar entry containing location information.

4. The method of claim 1, wherein the building includes a security system with a plurality of security system access points, and wherein the position-inference data comprises detection of a validated security token associated with the user at one of the security system access points.

5. The system of claim 1, wherein the position-inference data comprises detection of a device associated with the user connected to a wired network access port, and wherein the memory includes data associating the probable location with the wired network access port.

6. The system of claim 1, wherein the processor is to determine a probable location by determining that the probable location determination meets a confidence threshold and, in response, the processor sends a request for wireless AP signal measurements to the wireless device associated with the user.

7. The system of claim 1, wherein the processor is to update the wireless access point fingerprint by determining that the received wireless access point signal measurements do not differ from the fingerprint by more than a maximum amount.

8. The system of claim 1, wherein the position-inference data indicates the wireless device location at a first time, and wherein the processor is to receive a series of wireless access point signal measurements detected by the wireless device from the first time to a second time, and wherein the processor is to determine a probable path of travel for the wireless device from the probable location.

9. The system of claim 8, wherein updating the fingerprint includes updating fingerprints correlated to locations along the probable path based upon the series of wireless access point signal measurements.

10. The system of claim 1, wherein determining a probable location includes determining a confidence level in the probable location determination, and wherein the confidence level depends, in part, upon the source of the probable location determination.

11. A method of refining an indoor positioning system for a building, wherein the system correlates map locations to respective wireless access point (AP) fingerprints, and wherein each wireless AP fingerprint is a plurality of wireless AP signal measurements associated with the correlated map location, the method comprising:
  receiving position-inference data associated with a user;
  determining a probable location inside the building based on the position-inference data;
  receiving wireless AP signal measurements detected by a wireless device associated with the user;
  associating the probable location with the wireless device based on the association between the position-inference data and the user of the wireless device; and
  updating a wireless AP fingerprint correlated to the probable location using the received wireless AP signal measurements.

12. The method of claim 11, wherein the position-inference data is received from a source other than the wireless device.

13. The method of claim 11, wherein the position-inference data comprises a calendar entry containing location information.

14. The method of claim 11, wherein the position-inference data comprises detection of a validated security token associated with the user at a security system access point.

15. The method of claim 11, wherein the position-inference data comprises detection of a device associated with the user connected to a wired network access port.

16. The method of claim 11, wherein determining a probable location includes determining that the probable location determination meets a confidence threshold and, in response, sending a request for wireless AP signal measurements to the wireless device associated with the user.

17. The method of claim 11, wherein updating the wireless access point fingerprint includes determining that the received wireless access point signal measurements do not differ from the fingerprint by more than a maximum amount.

18. The method of claim 11, wherein the position-inference data indicates the wireless device location at a first time, and wherein receiving the wireless access point signal measurements includes receiving a series of wireless access point signal measurements detected by the wireless device from the first time to a second time, and wherein determining the probable location further includes determining a probable path of travel for the wireless device from the probable location.

19. The method of claim 18, wherein updating the fingerprint includes updating fingerprints correlated to locations along the probable path based upon the series of wireless access point signal measurements.

20. The method of claim 11, wherein determining a probable location includes determining a confidence level in the probable location determination, and wherein the confidence level depends, in part, upon the source of the probable location determination.

21. A non-transitory computer-readable medium, storing processor-executable instructions that, when executed by one or more processors, cause the one or more processors to carry out the method claimed in claim 11.

* * * * *